(12) United States Patent
Baraban et al.

(10) Patent No.: US 9,201,457 B1
(45) Date of Patent: *Dec. 1, 2015

(54) SYNCHRONIZING AND RECHARGING A CONNECTOR-LESS PORTABLE COMPUTER SYSTEM

(75) Inventors: Matthieu Baraban, Saint Jean De Vedas (FR); Yann Cheri, Montpellier (FR)

(73) Assignee: QUALCOMM Incorporated, San Diego, CA (US)

( * ) Notice: Subject to any disclaimer, the term of this patent is extended or adjusted under 35 U.S.C. 154(b) by 780 days.

This patent is subject to a terminal disclaimer.

(21) Appl. No.: 11/430,786

(22) Filed: May 8, 2006

Related U.S. Application Data

(63) Continuation of application No. 09/861,276, filed on May 18, 2001, now Pat. No. 7,065,658.

(51) Int. Cl.
*G06F 1/26* (2006.01)
*G06F 1/16* (2006.01)
*G06F 17/30* (2006.01)

(52) U.S. Cl.
CPC ........ *G06F 1/1635* (2013.01); *G06F 17/30575* (2013.01)

(58) Field of Classification Search
CPC ....... G06F 1/1635; G06F 1/1698; G06F 1/26; G06F 17/30575
USPC ........................................................ 713/300
See application file for complete search history.

(56) References Cited

U.S. PATENT DOCUMENTS

| | | | |
|---|---|---|---|
| 5,375,226 A | 12/1994 | Sano et al. | |
| 5,455,466 A | 10/1995 | Parks et al. | |
| 5,596,567 A | 1/1997 | de Muro et al. | |
| 5,600,225 A | 2/1997 | Goto | |
| 5,666,530 A * | 9/1997 | Clark et al. | 707/201 |
| 5,727,202 A | 3/1998 | Kucala | |
| 5,733,313 A | 3/1998 | Barreras et al. | |
| 5,760,580 A | 6/1998 | Tyren | |

(Continued)

FOREIGN PATENT DOCUMENTS

| | | |
|---|---|---|
| CN | 1592197 A | 3/2005 |
| EP | 0 395 469 | 10/1990 |

(Continued)

OTHER PUBLICATIONS

Mel et al., "Tablet: personal computer of the year 2000", Communications of the ACM, vol. 31 Issue 6, Jun. 1988.*

(Continued)

*Primary Examiner* — Albert Wang
(74) *Attorney, Agent, or Firm* — Mahamedi Paradice LLP

(57) ABSTRACT

A ruggedized connector-less cordless portable computer system is disclosed. In one embodiment, the portable computer system includes ports adapted to use wireless technology e.g., GSM, CDMA, LAN, Bluetooth, and infrared for synchronization. Furthermore, the device may be a palm-sized device having a rechargeable battery. In one embodiment of the present invention, the portable computer system includes a secondary coil of a transformer where the transformer's primary coil resides in an electronic cradle. The portable computer's rechargeable battery is recharged through an induction charging system. The wireless communication and induction charging system enables a device that is connector-less and therefore watertight and resilient to adverse climate conditions.

18 Claims, 9 Drawing Sheets

(56) References Cited

U.S. PATENT DOCUMENTS

| | | |
|---|---|---|
| 5,831,348 A | 11/1998 | Nishizawa |
| 5,832,489 A | 11/1998 | Kucala |
| 5,884,323 A | 3/1999 | Hawkins et al. |
| 5,958,051 A | 9/1999 | Renaud et al. |
| 6,006,274 A | 12/1999 | Hawkins et al. |
| 6,138,245 A | 10/2000 | Son et al. |
| 6,184,651 B1* | 2/2001 | Fernandez et al. ............ 320/108 |
| 6,266,539 B1 | 7/2001 | Pardo |
| 6,330,436 B1 | 12/2001 | Zidel |
| 6,389,423 B1 | 5/2002 | Sakakura |
| 6,400,274 B1 | 6/2002 | Duan et al. |
| 6,405,049 B2 | 6/2002 | Herrod et al. |
| 6,436,299 B1 | 8/2002 | Baarman et al. |
| 6,445,936 B1 | 9/2002 | Cannon et al. |
| 6,501,364 B1 | 12/2002 | Hui et al. |
| 6,510,424 B1* | 1/2003 | Ford et al. .......................... 707/3 |
| 6,532,152 B1* | 3/2003 | White et al. ................. 361/692 |
| 6,673,250 B2 | 1/2004 | Kuennen et al. |
| 6,731,071 B2 | 5/2004 | Baarman |
| 6,795,110 B1* | 9/2004 | Kossin ............................. 348/81 |
| 6,803,744 B1 | 10/2004 | Sabo |
| 6,806,649 B2 | 10/2004 | Mollema et al. |
| 6,810,405 B1* | 10/2004 | LaRue et al. ................. 707/201 |
| 6,812,645 B2 | 11/2004 | Baarman |
| 6,825,620 B2 | 11/2004 | Kuennen et al. |
| 6,831,417 B2 | 12/2004 | Baarman |
| 6,888,438 B2 | 5/2005 | Hui et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,323,964 B1 | 1/2008 | Shyu et al. |
| 7,331,793 B2 | 2/2008 | Hernandez et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,986 B2 | 12/2008 | Hatlestad |
| 7,495,414 B2 | 2/2009 | Hui |
| 7,521,890 B2 | 4/2009 | Lee et al. |
| 7,576,514 B2 | 8/2009 | Hui |
| 7,743,151 B2 | 6/2010 | Vallapureddy et al. |
| 2002/0084698 A1 | 7/2002 | Kelly et al. |
| 2002/0103008 A1* | 8/2002 | Rahn et al. .................... 455/557 |
| 2003/0214255 A1 | 11/2003 | Baarman et al. |
| 2003/0233455 A1 | 12/2003 | Leber et al. |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2004/0266362 A1 | 12/2004 | Watkins et al. |
| 2005/0007067 A1 | 1/2005 | Baarman et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2006/0041420 A1 | 2/2006 | Martin et al. |
| 2006/0061958 A1 | 3/2006 | Solomon et al. |
| 2006/0123055 A1 | 6/2006 | Atkinson et al. |
| 2006/0132045 A1 | 6/2006 | Baarman |
| 2006/0187049 A1 | 8/2006 | Moser et al. |
| 2007/0035917 A1 | 2/2007 | Hotelling et al. |
| 2007/0064406 A1 | 3/2007 | Beart |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0290654 A1 | 12/2007 | Govari et al. |
| 2008/0133918 A1 | 6/2008 | You et al. |
| 2008/0196086 A1 | 8/2008 | Shintani et al. |
| 2008/0231537 A1 | 9/2008 | Rofougaran et al. |
| 2008/0278894 A1 | 11/2008 | Chen et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0069869 A1 | 3/2009 | Stouffer et al. |
| 2009/0088077 A1 | 4/2009 | Brown et al. |
| 2009/0106567 A1 | 4/2009 | Baarman |
| 2009/0170433 A1 | 7/2009 | Rhodes et al. |
| 2009/0212637 A1 | 8/2009 | Baarman et al. |
| 2009/0212737 A1 | 8/2009 | Johnson et al. |
| 2010/0007449 A1 | 1/2010 | Tait et al. |
| 2010/0021176 A1 | 1/2010 | Holcombe et al. |
| 2010/0045269 A1 | 2/2010 | Lafranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0121965 A1 | 5/2010 | Chatterjee |
| 2010/0131691 A1 | 5/2010 | Chatterjee et al. |
| 2010/0146308 A1 | 6/2010 | Gioscia et al. |
| 2010/0156193 A1 | 6/2010 | Rhodes et al. |
| 2010/0172090 A1 | 7/2010 | Chatterjee |
| 2010/0177476 A1 | 7/2010 | Hotelling et al. |
| 2010/0194336 A1 | 8/2010 | Azancot et al. |

FOREIGN PATENT DOCUMENTS

| | | |
|---|---|---|
| EP | 0395469 A2 | 10/1990 |
| FR | 2 601 161 | 1/1988 |
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| WO | WO 95/03686 A1 | 2/1995 |
| WO | WO-02095555 A2 | 11/2002 |
| WO | WO 2004/098079 A1 | 11/2004 |
| WO | WO 2005/024865 A2 | 3/2005 |
| WO | WO 2007/034421 A2 | 3/2007 |
| WO | WO 2008/033670 A2 | 3/2008 |
| WO | WO 2008/044875 A | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/912691 A1 | 8/2010 |

OTHER PUBLICATIONS

Opticon, "User's Manual DWT 7133", Nov. 2000.*
Non-Final Office Action mailed Nov. 3, 2010 in U.S. Appl. No. 12/478,616 12 pgs.
U.S. Appl. No. 12/916,388, filed Oct. 29, 2010, Chatterjee et al.
International Search Report and Writen Opinion dated Feb. 23, 2011 in International Application No. PCT/US2010/042779.
U.S. Appl. No. 12/628,401, filed Dec. 1, 2009, Chatterjee.
U.S. Appl. No. 12/840,241, filed Jul. 20, 2010, Chatterjee.

(56) References Cited

OTHER PUBLICATIONS

U.S. Appl. No. 12/841,001, filed Jul. 21, 2010, Chatterjee.
U.S. Appl. No. 29/323,688, filed Aug. 28, 2008, Matsuoka.
Final Office Action mailed Oct. 25, 2004 in U.S. Appl. No. 09/861,658 10 pgs.
Hui et al., "A New Generation of Universal Contactless Battery Charging Platform for Portable Consumer Electronic Equipment," IEEE Trans Power Electronics, 20(3):620-627 (2005).
International Search Report and Writen Opinion dated Aug. 31, 2010 in International Application No. PCT/US2010/020054.
International Search Report and Written Opinion dated Aug. 20, 2010 in International Application No. PCT/US2009/069847.
International Search Report and Written Opinion dated Jul. 28, 2010 in International Application No. PCT/US2009/068332.
International Search Report and Written Opinion dated Jul. 21, 2010 in International Application No. PCT/US2009/068328.
International Search Report and Written Opinion dated Apr. 20, 2010 in International Application No. PCT/US2009/055928.
Kean, Steven, "Powermat Portable Wireless Charging Mat", pp. 1-12 dwnloaded from http://www.bigbruin.com/content/powermat_1 on Sep. 29, 2010.
Liang et al., "An implantable bi-directional wireless transmission system for transcutaneous biological signal recording," Physiol. Meas. 26:83-97 (2005).
Non-Final Office Action mailed Apr. 7, 2005 in U.S. Appl. No. 09/861,658 11 pgs.
Non-Final Office Action mailed Apr. 22, 2004 in U.S. Appl. No. 09/861,658 7 pgs.
Notice of Allowance mailed Jan. 9, 2006 in U.S. Appl. No. 09/861,658 12 pgs.

* cited by examiner

900

PLACE A PORTABLE COMPUTER SYSTEM ONTO A CRADLE COMPRISING AN INDUCTION CHARGING SYSTEM FOR CHARGING AN INTERNAL BATTERY OF THE PORTABLE COMPUTER SYSTEM. CHARGING MAY COMMENCE IMMEDIATELY AND LED WILL INDICATE ANY CHARGING ACTIVITY

A USER PRESSES A BUTTON ON THE CRADLE TO INVOKE WIRELESS COMMUNICATION E.G., SYNCHRONIZATION, WITH A HOST COMPUTER SYSTEM. TO PERFORM DATA SYNCHRONIZATION WITH THE HOST COMPUTER SYSTEM

FIGURE 9

SYNCHRONIZING AND RECHARGING A CONNECTOR-LESS PORTABLE COMPUTER SYSTEM

CROSS-REFERENCE TO RELATED APPLICATIONS

This is a continuation of U.S. patent application Ser. No. 09/861,276 filed May 18, 2001 now U.S. Pat. No. 7,065,658, which is incorporated herein by reference.

BACKGROUND OF THE INVENTION

The demand for use of computers has steadily grown over the period of the past several decades. The ever-increasing demand in use of the computers and widespread reliance of individuals as well as business entities on computers along with the reduction in the size of the components led to the innovation of portable computer systems. Shortly after the introduction of the portable computers to the marketplace, the users of these devices demanded flexibility in their use and portability. Consumers seeking mobility of their portable computers require wireless interconnectively.

Manufacturers, in general, provide portable computer systems equipped with wireless technology. Most all portable computers in the marketplace, nowadays, are equipped with some means of wireless communication. More specifically, wireless technology is advancing, both in the number of options that are available for providing connectivity, and in their flexibility to provide general purpose data communication. Different technologies such as GSM with Short Massage Service (SMS), NBS (Narrow Band Sockets), cellular technologies (e.g., CDMA, TDMA), LAN access technologies (e.g., IEEE 802.11, Home RF) and PAN technologies (e.g., Bluetooth, IR), each address different set of needs, and provide different set of potential services. Many different applications are currently being developed for portable computer systems in order to make use of the wireless communication features offered by these platforms.

The popularity of portable computers caused favorable changes in manufacturing forecasts and manufacturing plans to satisfy the market demands. However, along with such increase in popularity came the consumer demand for new features, features commensurate with the nature and method of use of portable devices. The consumers demanded a smaller in size portable computer to ease portability, a larger size memory to satisfy the ever increasing applications supported by these portable computers, a longer lasting power supply to enable the users an uninterrupted sessions with a portable computers, and finally a device resilient to adverse climate conditions.

Regardless of all efforts by different manufacturers to satisfy the consumer's demands, the devices available in the marketplace are yet to address one important consumer demand, a portable computer with wireless capability and resilient to adverse climate conditions.

Typically, portable electronic devices are employed while the user is on the run, e.g., in business meetings, on business travel, personal travel, in a vehicle, on foot etc. These devices are commonly accepted and are being used throughout a year and under different atmospheric conditions. A device may be used in a very moist environment, or left in a place where humidity is very high, or the user of a device may inadvertently expose a portable computer to water. The present portable electronic devices are not protected against such adverse atmospheric environments. The consumer requirements for a device resilient to adverse climate conditions have not even been addressed.

Thus a need exists for a portable computer system capable of wireless interconnectivity with other similar devices or with host computers which are capable of transceiving wireless communications. Furthermore, a need exist for a portable computer with wireless interconnectivity which can withstand adverse climate condition by minimizing exposure of its internal components to adverse climate conditions. Additionally, a need exist for a user friendly device, a device that is easily portable and conveniently rechargeable.

SUMMARY OF THE INVENTION

The present invention enables an owner of a handheld electronic device to have a wide range of wireless interconnectivity in a ruggedized, connector-less platform. The present invention further provides a handheld computer system with an induction charging system enabling the user of the device to recharge the device without the need of connectors or wires. Furthermore, use of induction charging system in combination with wireless synchronization allows manufacturers to build a watertight portable computer systems.

A ruggedized cordless portable computer system is disclosed. In one embodiment, the portable computer system includes ports adapted to use wireless technology e.g., GSM, CDMA, LAN, Bluetooth, and infrared for synchronization with a host computer system. Furthermore, the device is adapted to have a rechargeable battery that does not require a connector. In one embodiment of the present invention, the portable computer system may be a handheld device and includes a secondary coil of a transformer where the transformer's primary coil resides in an electronic cradle. The portable computer's rechargeable battery is recharged through an induction charging system. The wireless communication and charging system enables a manufacturer to provide a device that is watertight and ruggedized, e.g., resilient to adverse climate conditions.

More specifically, an embodiment of the present invention includes a portable computer system comprising: a) a processor coupled to a bus; b) a memory unit coupled to the bus; c) a flat panel display screen coupled to the bus; d) a wireless communication port for communicating with a host computer system to perform data synchronization; e) an internal battery; and f) a wireless charging system for providing charge to the internal battery.

BRIEF DESCRIPTION OF THE DRAWINGS

Embodiments of the present invention are illustrated by way of example and not by way of limitation, in the figures of the accompanying drawings and in which like reference numerals refer to similar elements and in which:

FIG. 9 is a flow diagram of the steps in a process 800 for induction charging and wirelessly communicating with a handheld computer system.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Exemplary Palmtop Computer System Platform

The present invention is compatible with any electronic device having a wireless or other communication mechanism and organized records of information, such as a cell phone or a pager. One of the common types of electronic systems, which can be used in accordance with one embodiment of the present invention, is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface).

In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 1:
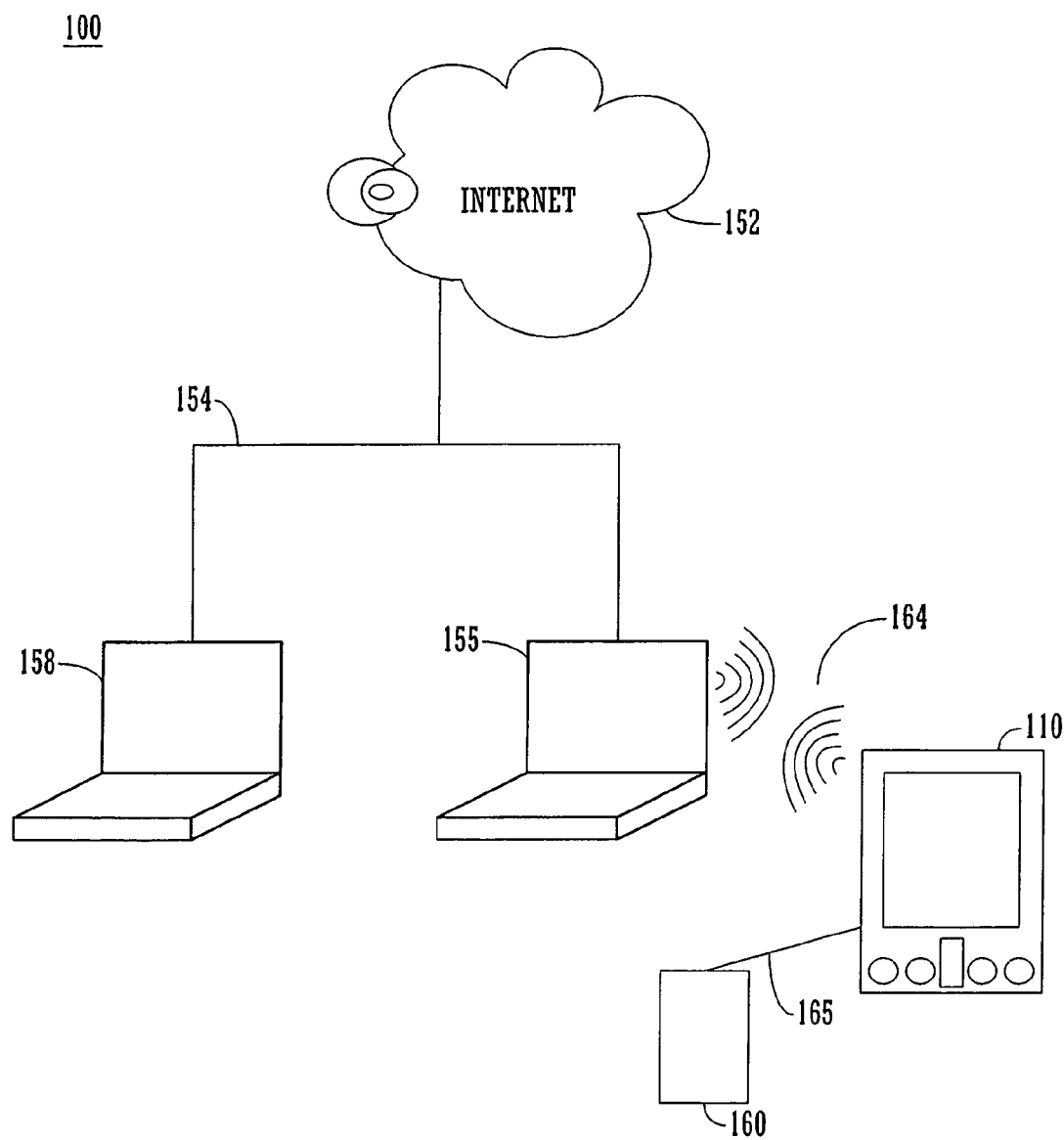
FIG. 1 is an illustration of a portable computer system or a "palm-sized" computer system connected to other computer systems and the Internet via a wireless communication link.

FIG. 1 is a block diagram of an exemplary network environment 100 including an exemplary Personal Digital Assistant (PDA) 110. The PDA 110 is also known as a palmtop or palm-sized electronic system or portable computer system. The PDA 110 has the ability to transmit and receive data and information over a wireless communication interface (e.g., a radio interface). The PDA 110 is one exemplary implementation on which the present invention can operate, although the present invention can operate on any portable electronic system or device.

In one embodiment, base station 155 is both a transmitter and receiver base station, which can be implemented by coupling it into an existing public telephone network 154. Implemented in this manner, base station 155 enables the personal digital assistant 110 to communicate with a proxy server computer system 158, which is coupled to the existing public telephone network 154. Furthermore, proxy server computer system 158 is coupled to the Internet 152, thereby enabling the PDA 110 to communicate with the Internet 152. It should be further appreciated that other embodiments of a communications network may be utilized in accordance with the present invention.

The data and information which are communicated between base station 155 and the personal digital assistant 110 are any type of information and data that can conventionally be transferred and received over a public telephone wire network system. However, a wireless communication interface is utilized to communicate data and information between the PDA 110 and base station 155. It should be appreciated that one embodiment of a wireless communication system in accordance with the present invention is the Mobitex wireless communication system.

Figure 2:
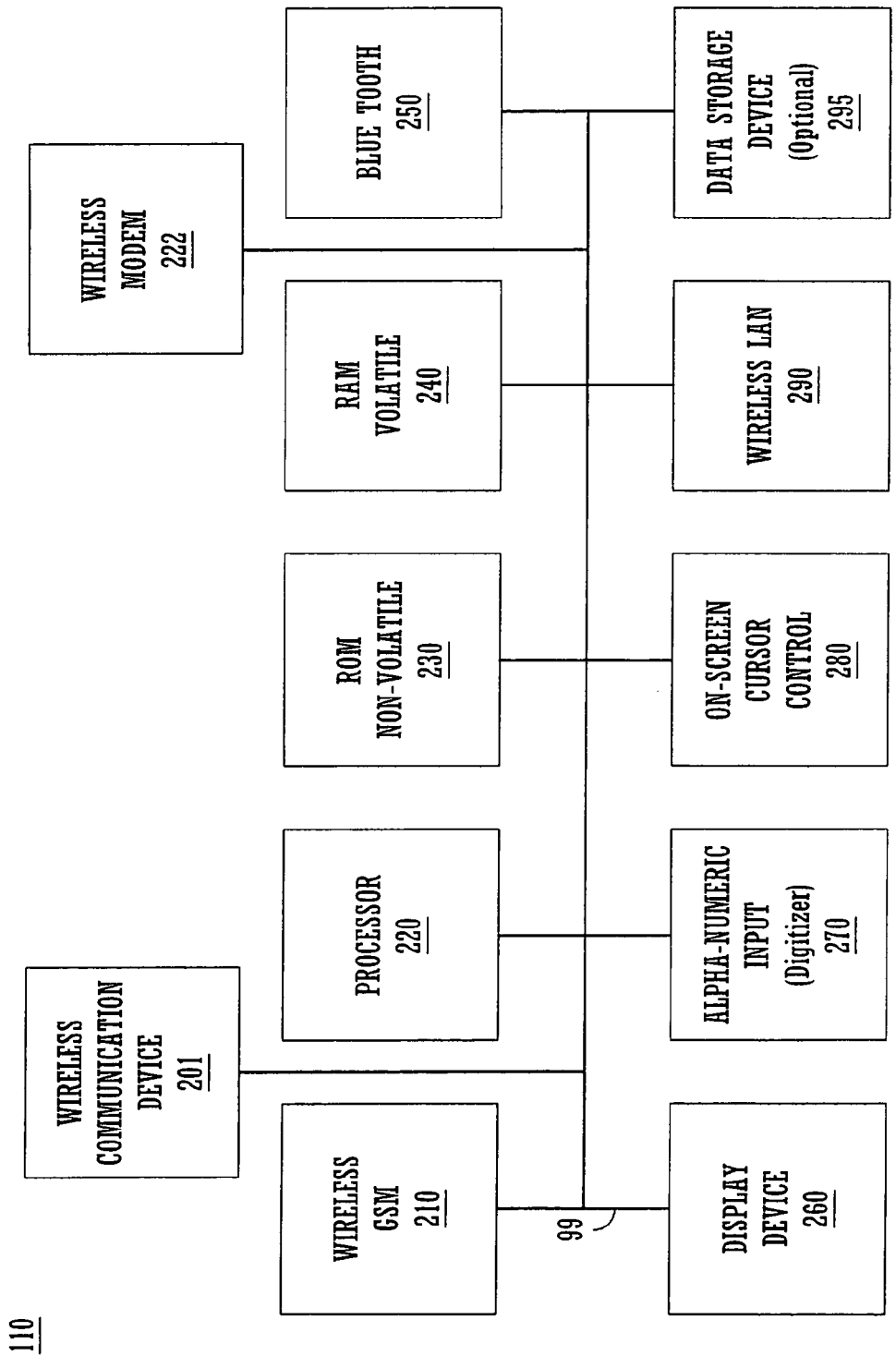
FIG. 2 is a logical block diagram of an exemplary portable computer system in accordance with an embodiment of the present invention.

FIG. 2 illustrates circuitry of portable computer system 200. Portable computer system 110 includes an address/data bus 99 for communicating information, a central processor 220 coupled with the bus 99 for processing information and instructions, a volatile memory 240 (e.g., random access memory RAM) coupled with the bus 99 for storing information and instructions for the central processor 220 and a non-volatile memory 230 (e.g., read only memory ROM) coupled with the bus 99 for storing static information and instructions for the processor 220. Computer system 110 also includes an optional removable data storage device 295 (e.g., thin profile removable memory) coupled with the bus 99 for storing information and instructions. As described above, system 110 also contains a display device 260 coupled to the bus 99 for displaying information to the computer user.

Figure 4:
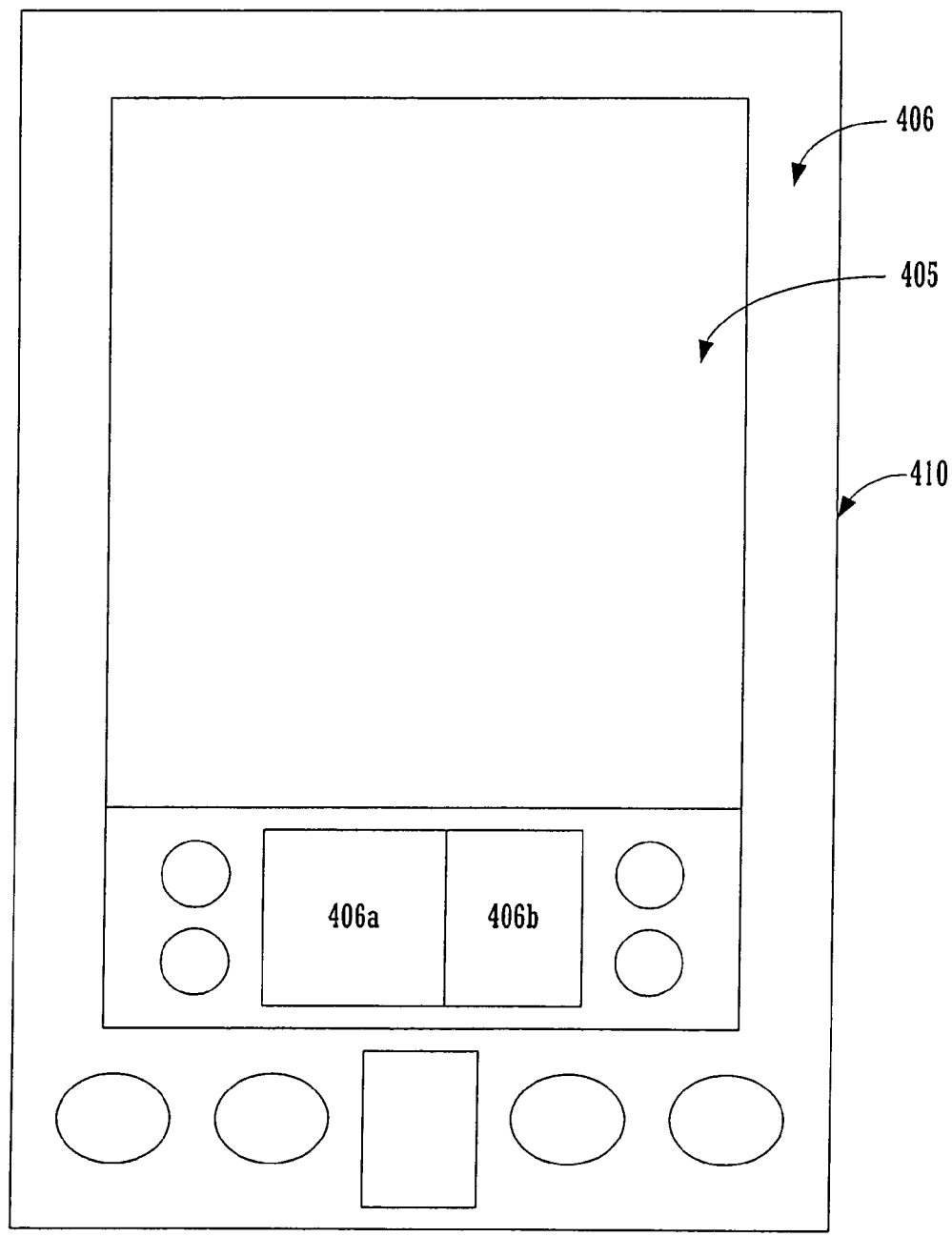
FIG. 4 is an illustration of the top face of an exemplary Personal Digital Assistant (PDA).

Also included in computer system 200 is an alphanumeric input device 270 which in one implementation is a handwriting recognition pad ("digitizer") having optional regions 406a and 406b (as shown in FIG. 4), for instance. Device 270 can communicate information (spatial data and pressure data) and command selections to the central processor 220.

System 110 also includes an optional cursor control or directing device 280 coupled to bus 99 for communicating user input information and command selections to central processor 220. In one implementation, device 280 is a touch screen device (also a digitizer) incorporated with screen 260. Device 280 is capable of registering a position on the screen 260 where the stylus makes contact and the pressure of the contact.

The display device 260 utilized with the computer system 110 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 260. In one embodiment, the display 260 is a flat panel multi-mode display capable of both monochrome and color display modes.

Wireless communication device (IR), IR 201, is included in the device 110 for communication with a host computer system 155 of FIG. 1 (or another portable computer system)

using, an infrared device. System 110 may also include a wireless modem device 222 and/or a wireless radio 210, e.g., a GSM wireless radio with supporting chipset. The wireless modem device 222 is coupled to communicate with the processor 220. A Bluetooth wireless communication port 250 can also be included.

In one implementation, the Mobitex wireless communication system may be used to provide two way communications between system 110 and other networked computers and/or the Internet via a proxy server 158 of FIG. 1. In other embodiments, TCP protocol can be used or SMS can be used. System 110 may also contain batteries, replaceable cells or rechargeable batteries, for providing electrical power. Well-known electronic devices may be coupled to the battery to detect its energy level and the processor 201 can sample this information.

Figure 3:
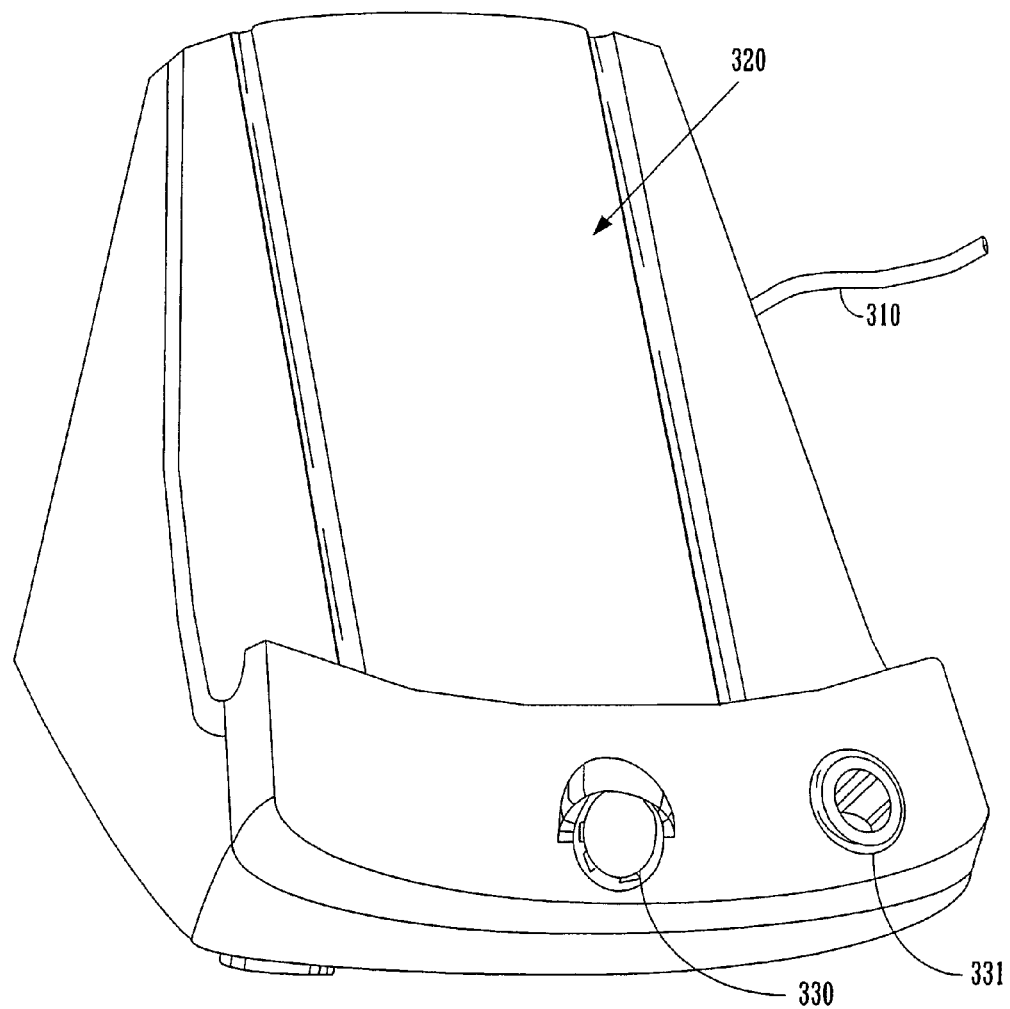
FIG. 3 is a perspective illustration of the top face of one embodiment of an electronic cradle without metal contacts for recharging the portable computer's rechargeable battery using induction charging.

FIG. 3 is a perspective illustration of an electronic cradle 300. One embodiment of the present invention, electronic cradle includes a primary coil of an induction transformer (as shown in 550 of FIG. 5). Electronic cradle 300 is electrically coupled to an alternating current source through an electrical cord 310. Recessed area 320 of electronic cradle 300 is designed to receive portable computer system 110 but contains no connectors. Electronic cradle 300 also includes a user interface 330 to activate synchronization function between portable computer system 110 of FIG. 1 and host device 155 of FIG. 1. A small LED 331 may indicate charging.

FIG. 4 is an illustration of the top face 410 of one embodiment of a portable computer system 110 (e.g., a palm-size handheld computer system). The top face 410 contains a display screen 405 surrounded by a cover 406. The display screen 405 is a touch screen able to register contact between the screen and the tip of a stylus. FIG. 4 also illustrates a handwriting recognition pad or "digitizer" containing two regions 406a and 406b. Region 406a is for the drawing of alphabetic characters therein (and not for numeric characters) for automatic recognition, and region 406b is for the drawing of numeric characters therein (and not for alphabetic characters) for automatic recognition. Note that device 110 contains no physical connector for either synchronization or charging.

Figure 5:
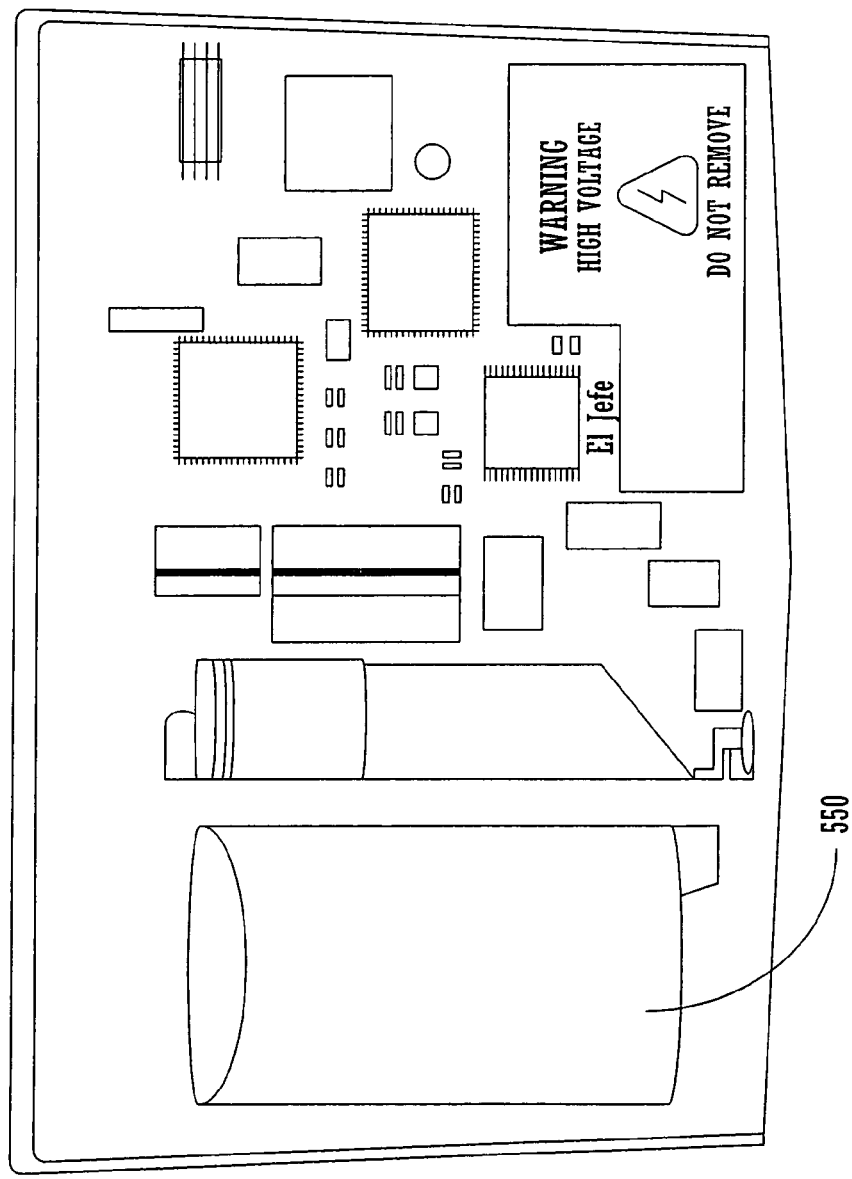
FIG. 5 is an illustration of the bottom side of a handheld computer system including secondary coil of a transformer and without serial connector.

FIG. 5 illustrates the backside of a portable computer system (e.g., a palm-sized computer system) 110 without its back cover. In one embodiment of the present invention, portable computer system 110 uses wireless technology for all communications between portable computer system 110 and all other devices equipped to receive such wireless communication. In this embodiment of the present invention, any serial connectors are eliminated because portable computer system 110 uses wireless technology (e.g., GSM with Short Massage Service (SMS), NBS (Narrow Band Sockets), cellular technologies (e.g., CDMA, TDMA), LAN access technologies (e.g., IEEE 802.11, Home RF) and PAN technologies (e.g., Bluetooth, IR)), for any type of host computer communication.

Figure 6:
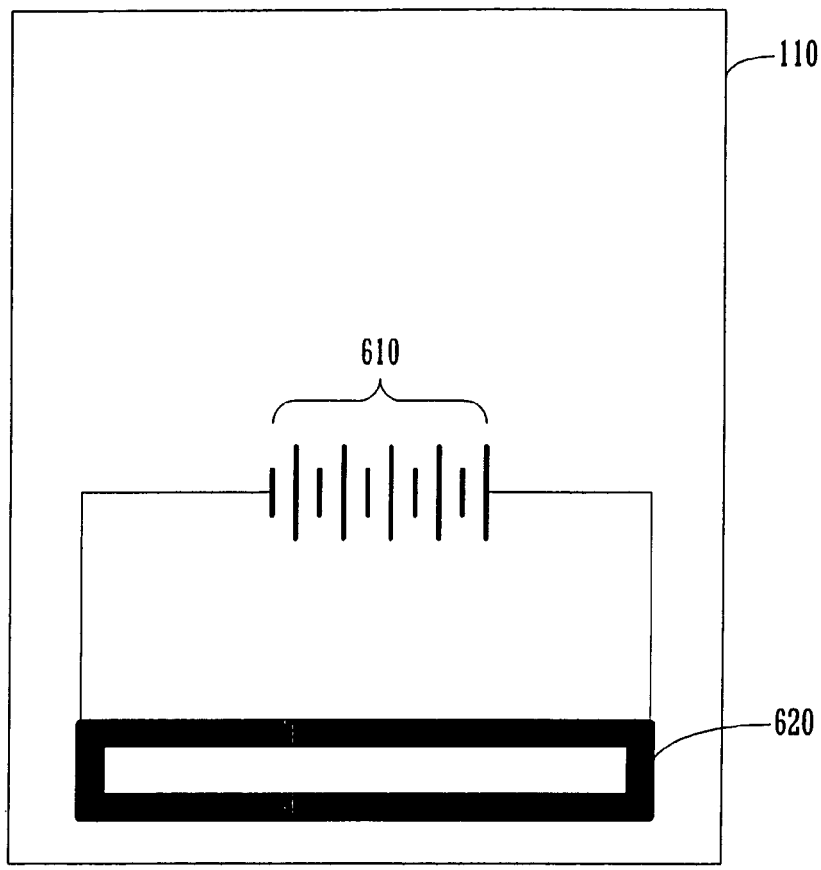
FIG. 6 is a schematic representation of a portable computer system with a secondary coil of the transformer and an electronic cradle including a primary coil of the transformer.
Figure 6:
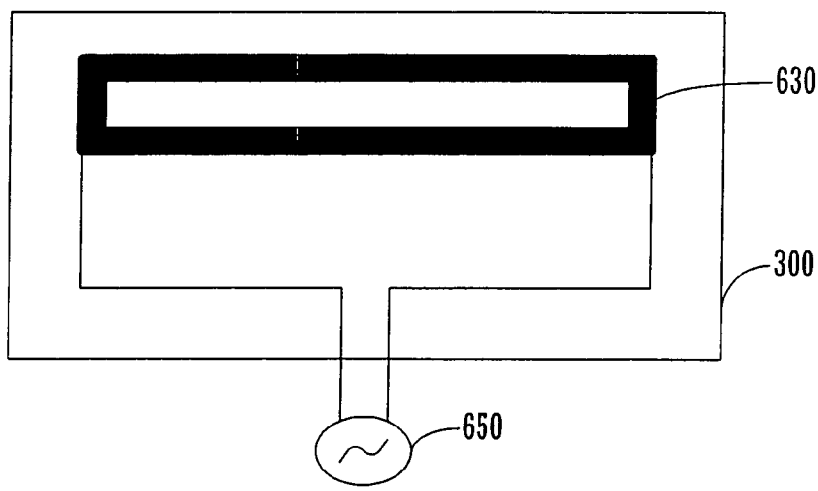

FIG. 6 depicts induction charging system 600 used in this embodiment of the present invention. In FIG. 6, the portable computer system 110 is placed onto the cradle 300, neither device has physical connector. Portable computer system 110 of FIG. 1 includes secondary coil 620 of transformer 550 of FIG. 5. Secondary coil 620 is electrically coupled to rechargeable battery 610. Primary coil 630 is electrically coupled to an alternating current source 650 within the cradle 300. Alternating electric current flowing in primary 630 induces voltage in secondary coil 620, which in turn charges rechargeable battery 610 (as shown in FIG. 7).

Figure 7:
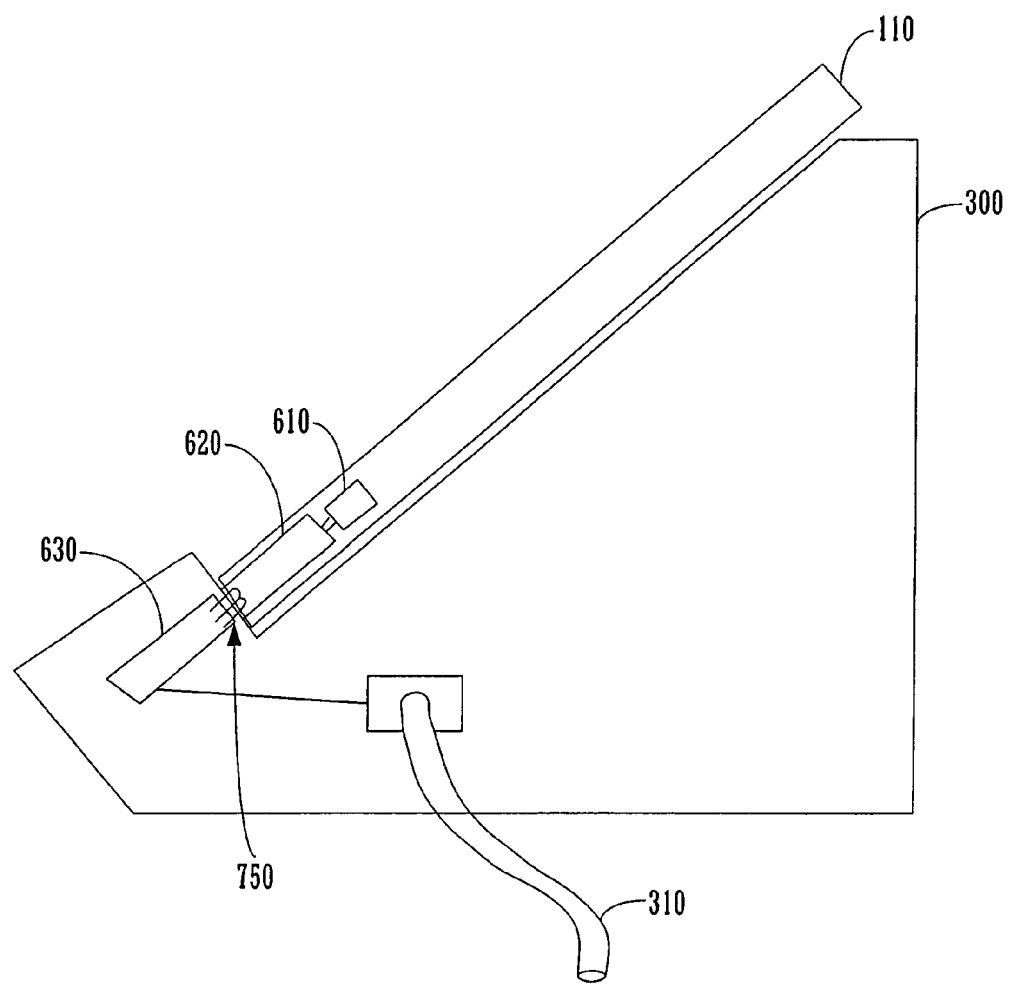
FIG. 7 depicts a portable computer system placed onto an electronic cradle for induction charging of the battery in the portable computer system.

FIG. 7 illustrate recharging of rechargeable battery 610 of FIG. 6. Portable computer system 110 is placed onto electrical cradle 300 of FIG. 3. Primary coil 630 of transformer 550 of FIG. 5 is electrically coupled to alternating source of power 650 of FIG. 6 through an electrical cord 310 of FIG. 3. Electronic cradle 300 does not include any meal or otherwise physical contact to cause recharging rechargeable battery 610 inside portable computer system 110. The recharging process is through induction system. Likewise, system 110 is connector-less.

Connector-less portable computer system 110 is placed onto electronic cradle 300 (as shown in FIG. 7), thus bringing secondary coil 620 and primary coil 630 within a short distance of each other. When Primary coil 630 is connected to alternating current source 550 the current flow in primary coil induces voltage in secondary coil 620 and the induced voltage charges rechargeable battery 610. It is appreciated that the induction system used for charging battery 610 does not require portable computer 110 to be removed from its protective casing nor does it require any metallic or physical contact or connector between electronic cradle 300 and portable computer system 110. When the cradle 300 is plugged in, charging may commence immediately upon the system 110 being placed onto cradle 300.

Figure 8:
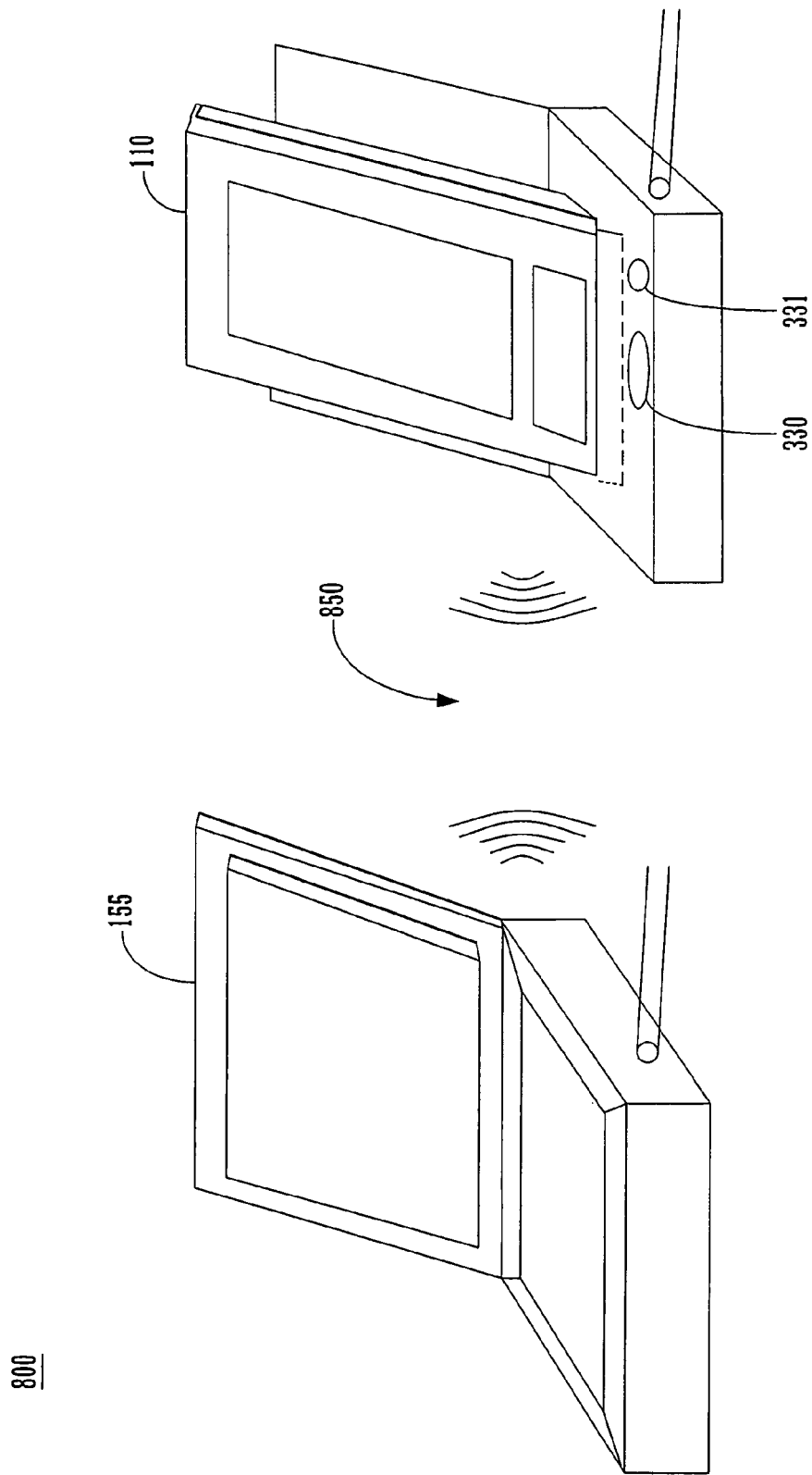
FIG. 8 illustrate a wireless communication session between the handheld computer system and a host device.

FIG. 8 illustrates a wireless communication session between portable computer system 110 and host device 155. It is appreciated that in one embodiment of the present invention a physical serial communication port is eliminated and replaced with a wireless communication port capable of communication with other devices by any of a number of well-known wireless communication standards and protocols, e.g., parallel, USB, SCSI, Firewire (IEEE 1394), Ethernet, etc. In the example of FIG. 8, synchronization may take place while recharging occurs. It is appreciated that cradle 300 need not be connected to host computer 155 by any physical means as shown by 850.

FIG. 9 is a flow diagram of the steps in a process 900 for induction charging and wirelessly communicating with a handheld computer system.

In step 910 portable computer system is placed onto a cradle comprising an induction charging system for charging an internal battery of the portable computer system. Charging may commence immediately and LED 331 will indicate any charging activity.

Step 920, in accordance with the present invention, a user pressing a button on the cradle 300 invokes a wireless communication e.g., synchronization with a host computer system to perform data synchronization with the host computer system.

For example, a portable computer system can be equipped with one of several wireless technologies (e.g., GSM with Short Massage Service (SMS), NBS (Narrow Band Sockets), cellular technologies (e.g., CDMA, TDMA), LAN access technologies (e.g., IEEE 802.11, Home RF) and PAN technologies (e.g., Bluetooth, IR)), thus capable of performing wireless synchronization. The same portable computer system may be equipped to synchronize information with other computer system equipped similarly.

Many users of portable computer systems also own personal computers. Often, a user runs applications in one system, which are similar to the applications and data in their other computer systems. A user, who owns both a palm size computer system and a personal computer, in similar circumstances, may wish to run an application in one system and update the other system accordingly without running the same application in the second computer system. In one embodiment of the present invention one computer system wirelessly synchronizes data with another computer system using well known processes. For example a user updates the calendar in portable computer system and updates the calendar in the personal computer system. The user does not need to run that same application on his/her personal computer.

Such an update is possible through synchronization, in accordance with teaching of "A METHOD AND APPARATUS FOR SYNCHRONIZING INFORMATION ON TWO DIFFERENT COMPUTER SYSTEM" U.S. Pat. No. 5,727,202 issued to Kucala on Mar. 10, 1998; and also teaching in "A METHOD AND APPARATUS FOR SYNCHRONIZING INFORMATION ON TWO DIFFERENT COMPUTER SYSTEM" U.S. Pat. No. 5,832,489 issued to Kucala on Nov. 3, 1998, both of which are hereby incorporated herein by reference.

Synchronization is also described in "METHOD AND APPARATUS USING A PASS THROUGH PERSONAL COMPUTER CONNECTED TO BOTH A LOCAL COMMUNICATION LINK AND A COMPUTER NETWORK FOR IDENTIFYING AND SYNCHRONIZING A PREFERRED COMPUTER WITH A PORTABLE COMPUTER" U.S. Pat. No. 6,006,274 issued to Hawkins et al on Dec. 21, 1999, hereby incorporated herein by reference.

The owner of a palm size computer system and a personal computer system may further wish to share files between portable computer systems and personal computer systems. An easy to use extendible file synchronization system is described in "EXTENDIBLE METHOD AND APPARATUS FOR SYNCHRONIZING FILES ON TWO DIFFERENT COMPUTER SYSTEMS" U.S. Pat. No. 5,884,323 issued to Hawkins et al on Mar. 16, 1999, hereby incorporated herein by reference. A single button press can initiate the synchronization of information between the two systems.

In this embodiment of the present invention synchronization process is by means of wireless communication, thus the devices need not be physically connected and the need for serial connector is eliminated. Furthermore, the rechargeable battery inside the portable computer system can be recharged by means of induction charging system. The cordless induction charging system and wireless communication allows the manufacturer of palm size computer system to manufacture a watertight device, which is ruggedized, e.g., can withstand adverse climate, e.g., those of high moisture content without degradation.

A ruggedized connector-less portable computer, as disclosed by the present invention, provides the owner of these devices with a more durable device. Such a connector-less device is protected against a broken connector or corroded connector simply because no metallic or physical connector is used for either recharging the battery or for synchronization. Additionally, an owner of such a connector-less device will not face a problem of disrupted communication caused by a corroded connector. Furthermore, such a ruggedized device substantially eliminates any problem resulting from rain, water moisture, broken or corroded connectors, which may hinder the operation of similar devices not protected as such.

In summary the present invention provides a method and a system that can wirelessly recharge a battery inside a portable computer system. In accordance with the present invention, the portable computer system is equipped to communicate with other devices, which are equipped to receive information. Furthermore, the present invention discloses a cordless device and without any exposed metal contact for being recharged. The device can be manufactured such that it is resilient to adverse climate conditions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable electronic device comprising:
   a housing;
   an interface component physically coupled with said housing, wherein said user interface component enables user-input of alpha-numeric data;
   an inductive charging system provided within said housing and operable to implement inductive charging; and
   a wireless communication interface provided within said housing, wherein said wireless communication interface, which is implemented separate from said inductive charging system, is operable to enable wireless synchronization of data between said portable electronic device and a second device simultaneously with said inductive charging;
   a processor configured to operate an application while using the wireless communication interface to send said data to the second device in order to update the second device without the second device operating an application that is to use said data.

2. The portable electronic device of claim 1, wherein said inductive charging system comprises:
   a coil; and
   a rechargeable battery coupled to said coil.

3. The portable electronic device of claim 1, further comprises a battery.

4. The portable electronic device of claim 1, wherein said wireless communication interface comprises an infrared interface.

5. The portable electronic device of claim 1, wherein said wireless communication interface comprises a Bluetooth wireless interface.

6. The portable electronic device of claim 1, wherein said wireless communication interface comprises a cellular interface.

7. The portable electronic device of claim 1, wherein said wireless communication interface is compliant with a CDMA protocol.

8. The portable electronic device of claim 1 further comprising:
   a memory unit coupled to said processor; and
   a display coupled to said processor.

9. The portable electronic device of claim 8, wherein said display is a touch-sensitive display.

10. The portable electronic device of claim 1, wherein said interface component comprises at least one physical key.

11. The portable electronic device of claim 1, wherein said housing is adapted to protect against environmental factors.

12. The portable electronic device of claim 1, wherein said housing is water tight.

13. The portable electronic device of claim 1, wherein said second device is a host computer system.

14. A method for performing communication comprising:
   inductively charging a battery disposed within a housing of a portable electronic device, wherein said housing is physically coupled with an interface component enabling user-input of alpha-numeric data; and synchronizing data between said portable electronic device and a second device while inductively charging said battery using a wireless communication interface directly between said portable electronic device and said second device;

wherein synchronizing data includes:

operating an application on said portable electronic device; and sending the synchronized data to the second device, in order to update the second device without the second device operating an application that is to use the data.

15. The method of claim 14, wherein said synchronizing data further comprises synchronizing data associated with a calendar application.

16. The method of claim 14, wherein said second device is host computer system.

17. The method of claim 14, wherein said synchronizing data further comprises making said data available to an application of said second device.

18. The method of claim 14, wherein said synchronizing data further comprises synchronizing data using a wireless interface selected from a group consisting of a cellular interface, a LAN access interface, a Bluetooth interface and an infrared interface.

* * * * *